United States Patent [19]

Larimer

[11] Patent Number: 4,775,983
[45] Date of Patent: Oct. 4, 1988

[54] HIGH SPEED LOGIC ANALYZER

[75] Inventor: Fred K. Larimer, Cambridge, Ohio

[73] Assignee: NCR Corporation, Dayton, Ohio

[21] Appl. No.: 102,515

[22] Filed: Sep. 28, 1987

[51] Int. Cl.[4] .................. H04B 3/46; H04B 17/00
[52] U.S. Cl. ............................ 375/10; 375/36; 375/121
[58] Field of Search .................. 375/10, 36, 121; 370/13, 14, 85; 340/825.06, 825.67, 825.68, 815.01

[56] References Cited

U.S. PATENT DOCUMENTS

| | | | |
|---|---|---|---|
| 3,973,242 | 8/1976 | Field et al. .................. | 340/168 B |
| 4,503,533 | 3/1985 | Tobagi et al. .................. | 370/85 |
| 4,618,965 | 10/1986 | Maxwell et al. .................. | 340/825.06 |
| 4,623,984 | 11/1986 | Yokokawa et al. .................. | 364/900 |
| 4,654,807 | 3/1987 | Bremer .................. | 375/10 |

FOREIGN PATENT DOCUMENTS

| | | | |
|---|---|---|---|
| 2039693A | 8/1980 | United Kingdom .................. | 375/10 |
| 2158679A | 11/1985 | United Kingdom .................. | 375/10 |

OTHER PUBLICATIONS

Linberg "A Versatile Approach to the Monitoring of Communication System" 1976 Telecommunication Conference, 1976–Nov. 29–Dec. 1.

Primary Examiner—Robert L. Griffin
Assistant Examiner—Stephen Chin
Attorney, Agent, or Firm—Jr. Hawk; Jr. Sessler; Richard W. Lavin

[57] ABSTRACT

A system for transmitting data characters from a communication channel to a datascope for displaying the data characters on a CRT screen includes a plurality of switch members settable to a position for identifying a predetermined source of the data message to be displayed. When a data message is transmitted over the communication channel, a plurality of comparator circuits detect the start of the data message and the source of the data message. Logic circuits add end of message characters to the data message and identify a character in the data message to be highlighted on the CRT screen when a collision occurs between two remote sources of data messages which are attempting to transmit a data message over the communication channel at the same time.

14 Claims, 5 Drawing Sheets

```
            182⌐  184⌐      186⌐
FEFFFFFFFFFFFFFF5555D5D5E0C6017708A163B5
  188⌐
FFFFFFFFFFFFFFFFAAAAD5D5E0C6127844D9E630

504D3352147530079000000000000000000000

0100053000000000FFFF000000000000004D30

72008000010000000000000000000121001050

BC000000090001503350310121704000000000

076222F60000000000000000000762C400000028

00000000000004353383000000000000010000000
```

HIGH SPEED LOGIC ANALYZER

BACKGROUND OF THE INVENTION

Local area networks have become very important in solving communication needs where a large number of remote processing devices are connected over a common communication channel to a host processor. As the operating speed of the remote devices increases, there arises a need to check the operation of the system. One test instrument that is used in this respect is a datascope which displays the binary characters being transmitted over the communication channel associated with the local area network. The datascope is also used to detect problems occurring in the network such as data collisions that occur between two or more remote devices attempting to gain control of the communication channel at the same time. The number of collisions occurring affect the response time of the network. The datascope can also be used to identify the amount of data that a certain remote device is transmitting. Present day datascopes are limited in their response time and therefore cannot display the data being transmitted by a device operative over a high speed local area network system.

SUMMARY OF THE INVENTION

The present invention relates to test instruments and more particularly relates to an interface unit associated with a datascope for displaying the digital characters transmitted over a high speed lcal area network.

In accordance with one embodiment, there is provided an interface unit connected to a datascope which includes a plurality of serial shift registers for storing binary data characters transmitted over a communication channel of a local area network, a plurality of comparator for comparing the address of the remote device outputting the data being stored in the shift register with a predetermined address of a remote device, a plurality of switch members for generating the address of the remote device required to be displayed on the datascope, which address is used by the comparators to detect the address of the remote device sending or receiving the received data and logic means for inserting data characters in the data stored in the shift registers designating the start and the ending of the data message outputted or received by the designated remote device and for detecting the occurrence of collisions on the network between two sending remote devices.

Therefore a principal object of this invention is to provide an interface unit associated with a datascope having a high frequency response enabling the datascope to display data characters being transmitted over a high speed local area network.

It is another object of this invention to provide an interface unit for a datascope which can selectively control the displaying of data outputted by one of a plurality of remote processing devices.

It is a further object of this invention to provide an interface unit for a datascope which can control the datascope to indicate on its screen the presence of a collision between two requesting remote processing devices.

The various objects, features and advantages of the invention, as well as the invention itself, will become more apparent to those skilled in the art in the light of the following detailed description taken together with the accompanying drawings wherein like reference numerals indicate like or corresponding parts throughout the several views and wherein:

DESCRIPTION OF THE PREFERRED EMBODIMENT

It should be noted at this time that throughout this description of the preferred embodiment, the presence of a / following either a symbol or an acronym represents the logical inversion of that symbol or acronym. Unless otherwise noted, all designated integrated circuit elements are commercially available from the Texas Instrument Corporation of Dallas, Texas.

Figure 1:
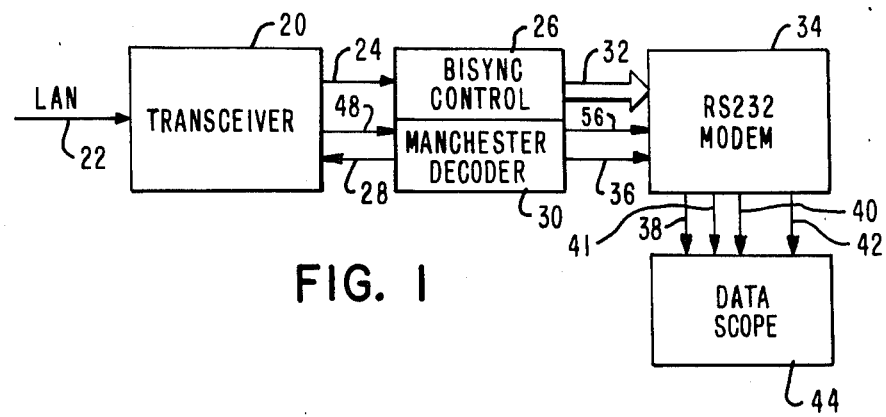
FIG. 1 is a block diagram of the interface unit of the present invention showing the connections to a datascope.

Referring now to FIG. 1, there is shown a block diagram of the interface unit together with its connection to the datascope which includes a transceiver unit 20 coupled to a local area network (LAN) communication channel 22 over which data messages comprising a plurality of binary characters are transmitted. The transceiver unit will transmit over line 24 to a bisync control unit 26 a carrier sense control signal CRS/ (FIG. 2) indicating, when active low, that a transmission carrier is present together with a transmitted binary data message. The transceiver unit 20 will also transmit over line 48 to a Manchester decoder unit 30 binary data bits and clock signals associated with the data message transmitted over the communication channel 22. The bisync control unit 26 is designed to identify the beginning and the end of the transmitted data message and will output over bus 32 data and clock signals to a RS232 modem unit 34 which transmits the signals over lines 38-42 inclusive to a datascope unit 44. The bisync control unit 26 will add bisync data link control characters to the received data message to meet Bisync Industry standards by which the datascope operates. The Manchester decoder unit 30 separates the data/clock bit stream received from the transceiver 20 over line 48 and transmits over line 56 clock signals to the modem unit 34 for use in synchronizing the transmission of the data signals over lines 38-42 inclusive to the datascope unit 44.

Figure 2:
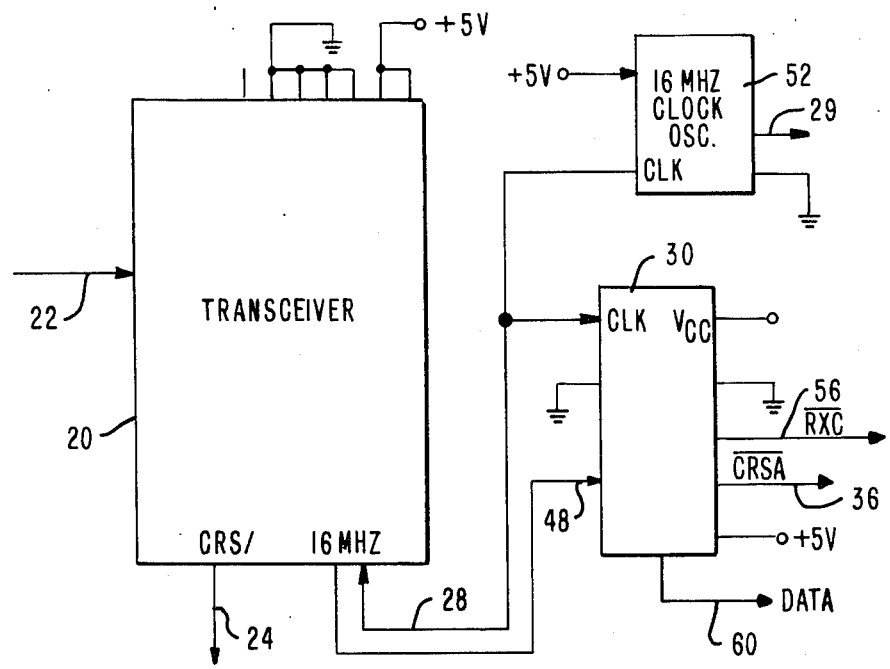
FIG. 2 is a block diagram of the transceiver and the Manchester decoder of FIG. 1.

Referring now to FIG. 2, there is shown a more detailed diagram of the transceiver unit 20 and the Manchester decoder unit 30 in which the transceiver unit 20 is connected to a clock oscillator unit 52 which generates 16 MHz clock pulses for transmission over line 28 to the transceiver unit 20 and to the decoder unit 30. The transceiver unit will output over line 24 to the bisync control unit 26 (FIG. 1) the carrier sense signal CRS/ which goes high when the transmission carrier disappears indicating the end of the data transmission. The transceiver unit 20 will also output over line 48 to the decoder unit 30 the data and clock signals of the data message. The Manchester decoder unit 30, in response to receiving the clock and data signals over line 48, will output over line 56 the 1.2 MHz clock pulses RXC/ and over line 60 the data signals to the bisync control unit 26. The decoder unit 30 will also output over line 36 to the modem unit 34 (FIG. 1) the carrier sense away control signal CRSA/ which becomes high when the transmission carrier on the communication channel 22 goes away.

Figure 3A:
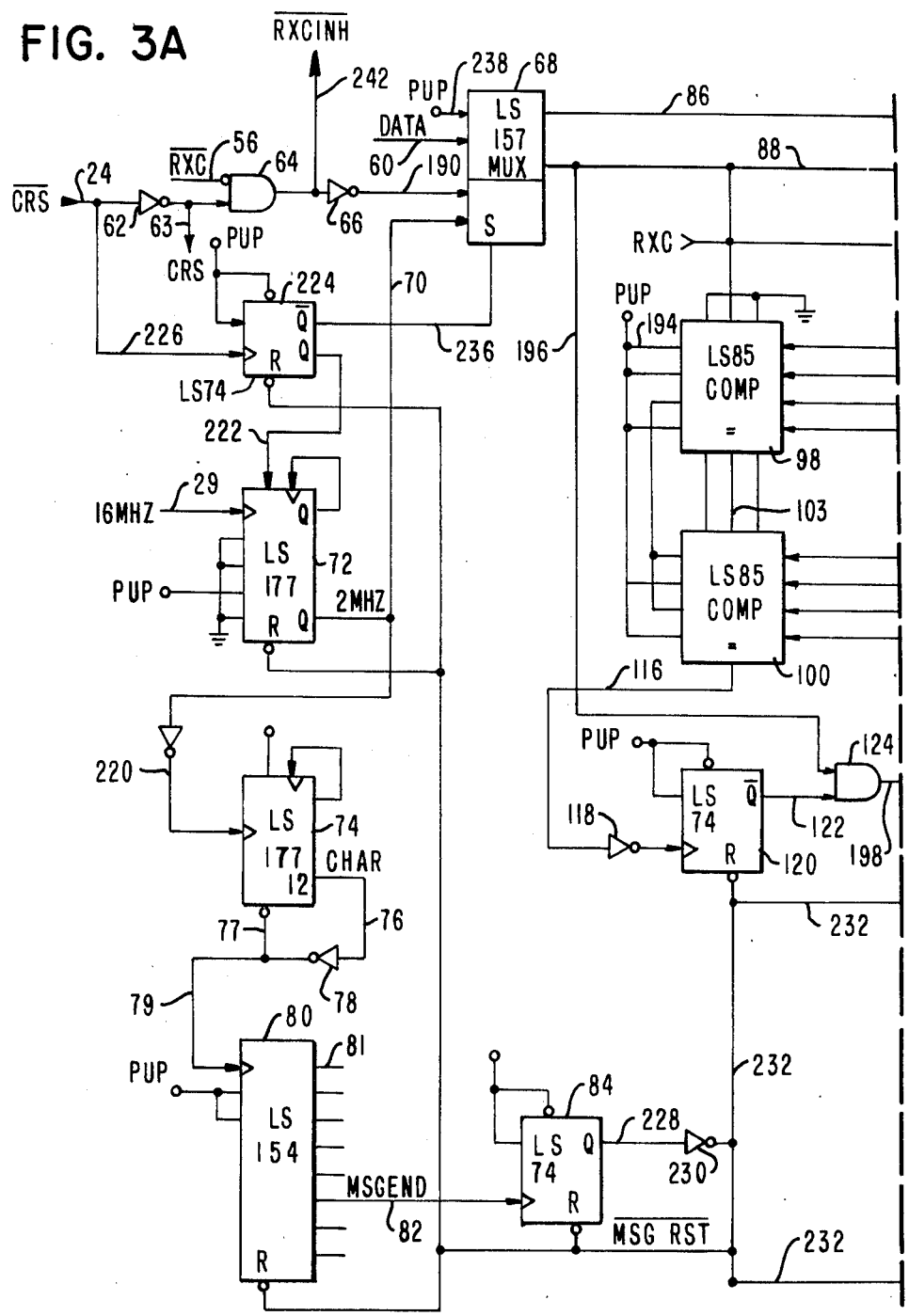
FIGS. 3A-3C inclusive, arranged as shown in FIG. 4, disclose a block diagram of the bisync control unit and the RS-232 modem unit of FIG. 1.
Figure 3B:
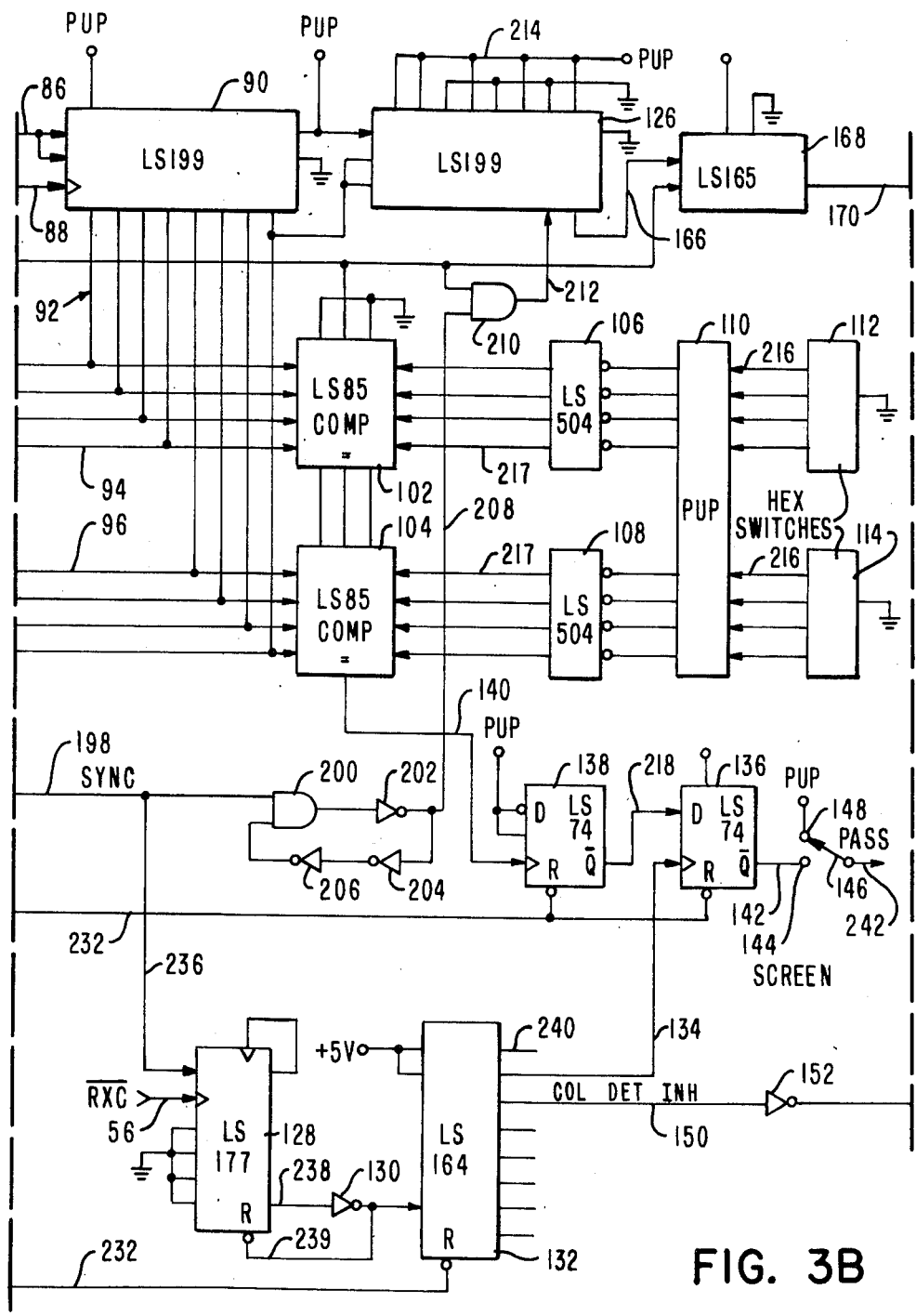
Figure 3C:
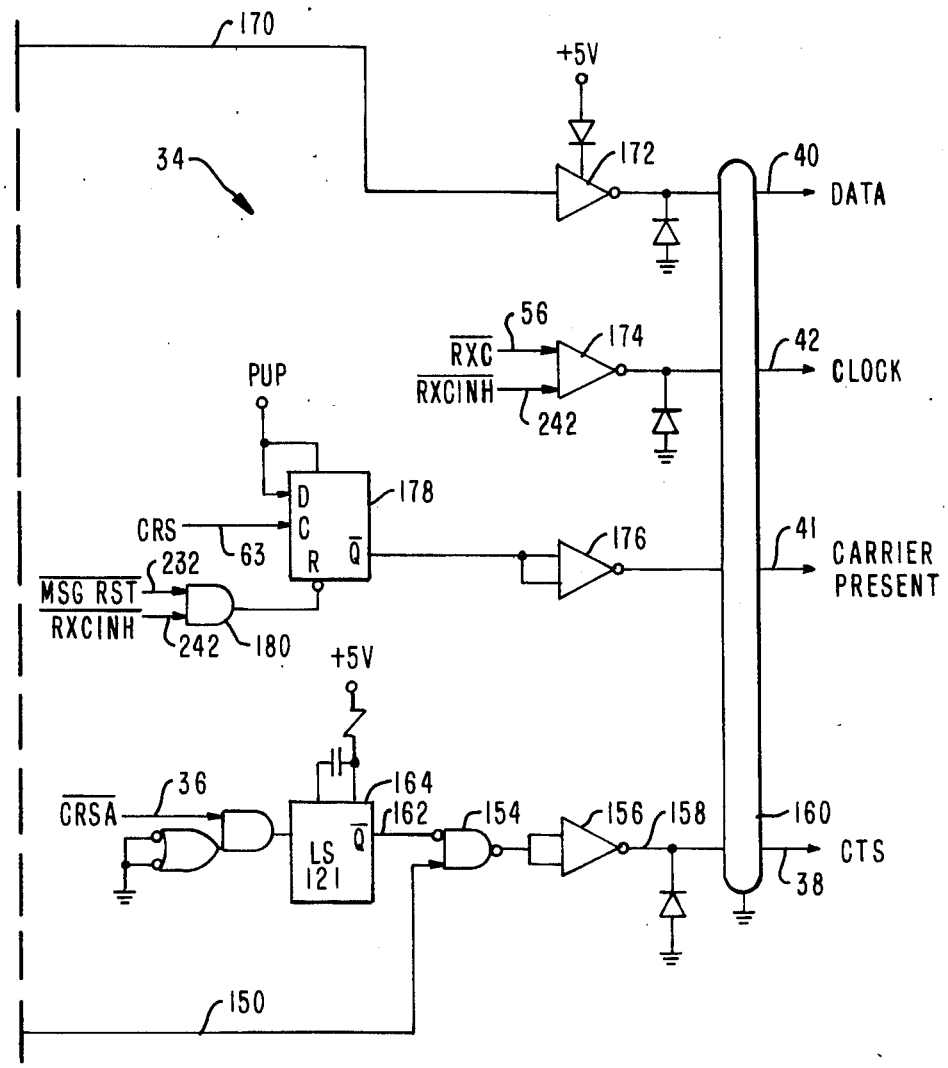

Referring now to FIGS. 3A-3C inclusive, there is shown a block diagram of the bisync control unit 26 (FIG. 1) and the modem unit 34. As shown in FIG. 3A, the control signal CRS/ appearing on line 24 will be transmitted through the inverter 62 to one input of a two input AND gate 64 which also receives on its other input the inverted clock pulse RXC/ over line 56 from the Manchester decoder unit 30 (FIG. 2). The output signal RXCINH/ of the AND gate 64 is transmitted through an inverter 66 to the clock input of a multiplexer 68 which receives over the input line 60 the data characters from the Manchester decoder unit 30 (FIG. 2) and also over the input line 70, a plurality of 2 MHz clock pulses outputted from a 74LS177 counter 72. The counter 72 receives over its input line 29 the 16 MHz clock pulses from the clock oscillator 52 (FIG. 2). Associated with the counter 72 is a second 74LS177 counter 74 which will output over line 76 the low control binary signal CHAR indicating the transmission of an eight bit binary character in the data appearing on line 60 of the multiplexer unit 68. The signal CHAR will be outputted over line 76 through an inverter 78 as a clock pulse to a 74LS154 shift register 80. As the pulses clock the shift register 80, a high message end signal MSGEND will appear on the output line 82 after six characters have been counted which signal clocks a 74LS74 D-type flip-flop 84.

The data signals appearing on the input line 60 of the multiplexer 68 (FIG. 3A) will be outputted over line 86 for storage in a shift register 90 (FIG. 3B), which signals are clocked in by the 1.2 MHz clock pulses RXC/ appearing on line 88. The binary data bits being shifted into the shift register 90 will appear on the output lines 92 of the register which interconnect with lines 94 and 96 which in turn are connected to a plurality of 74LS85 comparators 98-104 (FIGS. 3A and 3B). As will be explained more fully hereinafter, the comparators 98 and 100 will detect the occurrence of the binary character D5 in the incoming data message while the comparators 102 and 104 will detect a predetermined eight bit sender's address in the data message identifying the terminal device outputting or receiving the data message, which address is inverted by the inverters 106 and 108. The address bits inverted by the inverters 106 and 108 are pulled up to a +5V level by a pull-up circuit 110 transmitted from a plurality of manually operated hexadecimal switches 112 and 114.

Upon the comparators 98 and 100 (FIG. 3A) finding the address of the required terminal device in the data bits stored in the shift register 90, a high signal will appear on the output line 116 of the comparator unit 100 which is inverted by the inverter 118 for clocking a 74LS74 D-type flip-flop 120. Clocking of the flip-flop 120 results in a low signal appearing on the Q/ output line 122 which is inputted into a two input AND gate 124 whose output signal SYNC will be transmitted over line 198 to synchronize the clocking of a shift register 126 (FIG. 3B) for storing data outputted by the shift register 90 in a manner that will be described more fully hereinafter. The output signal of the AND gate 124 will also enable an 74LS177 divide by eight counter 128 (FIG. 3B) which is clocked by the 1.2 MHz clock pulses RXC/ appearing on input line 56. Upon reaching a count of eight which represents the number of binary bits in a character, the counter 128 will output a clock pulse over line 238 and through the inverter 130 to the clock input of a 74LS164 shift register 132 which is part of a collision detect circuit as will be described more fully hereinafter. The output clock pulse of the inverter 130 is also transmitted over line 239 to reset the counter 128.

Upon detecting the second character in the data message, the counter 128 clocks the register 132 to output a signal over line 134 to the clock input of a D-type 74LS74 flip-flop 136 (FIG. 3B) clocking the flip-flop. The clocking of the flip-flop 136 will output a signal derived from the Q/ output of a D-type 74LS74 flip-flop 138 which is clocked by a high signal appearing on the output line 140 of the comparator unit 104 indicating a message from the designated remote device has been detected in the data message inputted into the shift register unit 90. The Q/ signal appearing on the output line 142 of the flip-flop 136 is transmitted to one contact 144 of a manually actuated switch member 146. When the switch member 146 is moved to the contact 144, the Q/ signal is transmitted to the datascope unit over line 242 enabling the data message of the designated remote device selected by the switches 112 and 114 to be sent to the datascope unit. When the switch member 146 is moved to contact 148, a constant +5 volt signal will be outputted over line 242 resulting in all of the data inputted into the interface being displayed on the screen of the datascope unit.

Upon detecting the third character in the data message, the shift register unit 132 will output over line 150 the collision detect inhibit signal, COL DET INH through an inverter 152 to one input of an NAND gate 154 (FIG. 3C) whose output signal is transmitted through a LS75188 line driver 156 located in the RS232 modem unit 34. The modem unit outputs a signal over line 158 to a datascope connector 160 which in turn transmits the clear to send signal CTS over line 38 (FIGS. 1 and 3C) to the datascope unit 44 (FIG. 1) enabling the datascope unit to display the data being inputted into the interface. The NAND gate 154 receives a signal over its other input line 162 from the Q/ output of a 74LS121 one shot circuit 164 whose input signal is derived from the carrier sense signal CRSA/ appearing on the input line 36 and transmitted from the Manchester decoder unit 30 (FIG. 2). As will be described more fully hereinafter, the signal CRSA/ goes high when a collision occurs on the channel 22 between two remote terminal devices attempting to send data at the same time. The signal CRSA/ will enable the one shot circuit 164 to output the clear to send signal CTS enabling the datascope unit 44 to highlight one of the first two characters of the data message being displayed, thereby visually indicating the occurrences of such a collision.

In a similar manner, the data message stored in the shift register 126 (FIG. 3B) is outputted over line 166 to a 74LS165 shift register 168 which outputs the data message over output line 170 to a LS75188 line driver 172 located in the RS232 modem unit 34 (FIG. 1) which in turn outputs the data to the datascope connector 160 from where the data is transmitted over line 40 to the datascope unit 44 (FIG. 1). Also included in the RS232 modem unit 34 is a LS75188 line driver 174 which receives at one input the clock pulse RXC/ and at its other input the clock inhibit signal RXCINH/ appearing on line 242 (FIG. 3A). Further included in the RS232 modem 34 is a LS75188 line driver 176 which receives an output signal from a D-type flip-flop 178 when clocked by the carrier sense signal CRS/ appearing on line 63 and reset by the message reset signal MSG RST/ or the clock inhibit signal RXCINH/ both of which are inputted into the two input NAND gate 180. The output signals of the line drivers 172-176 inclusive are transmitted through the connector 160 to the appropriate sections of the datascope unit enabling the data message to be displayed on the screen of the datascope unit.

Figures 4, 5:
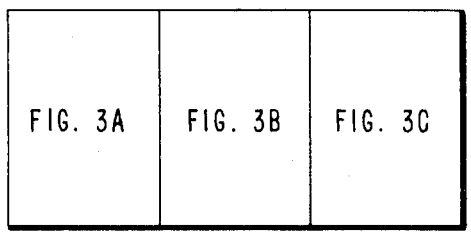
FIG. 5 is a illustration of the characters displayed on the screen of the datascope showing the location of the inserted characters indicating the start and the ending of a data message.

Referring now to FIG. 5, there are illustrated the data messages that are displayed on the screen of the datascope unit 44 (FIG. 1) and outputted by the transceiver unit 20 as part of a communication operation. Each message starts with a preamble 182 comprising a pattern of alternating 1's and 0's but displayed on the screen of the datascope as the characters 55 or the hex characters AA. There are at least two and no more than eight characters in the preamble. The preamble is followed by sync characters 184 which in the present embodiment comprise the character D5. As will be explained more fully hereinafter, the detecting of the first D5 character 184 will result in the changing of a second character to D5 adjacent to the first character. The position of the next character E0 indicates the address of the destination device while the position of the following character C6 indicates the address of the sending device. Following the sender's address are a plurality of data characters 186 which can be of any length followed by no more than six trailing characters 188 indicating the end of the message.

In the operation of the system, data signals appearing on the communication channel 22 (FIG. 1) of the local area network (LAN) will be inputted into the transceiver unit 20 which outputs over line 48 to the Manchester decoder unit 30 the data message and also over line 24 to the bisync control unit 26 the active low carrier sense signal CRS/. The Manchester decoder unit 30 (FIG. 2) will output the 1.2 MHz clock pulses RXC/ over line 56 to the bisync control unit 26 and also to the modem unit 34. The Manchester decoder unit 30 will also output over line 36 to the modem unit 34 the carrier sense away signal CRSA/ and the data signals over line 60 (FIG. 2) to the bisync control unit 26.

As shown in FIG. 3A, the data signals appearing on line 60 and the clock signals RXC/ appearing on input line 56 to the AND gate 64 are inputted into the multiplexer 68. The AND gate 64 is enabled by the signal CRS/ appearing on line 24 which is transmitted through the inverter 62 to the AND gate 64 which outputs the clock pulses RXC/ through the inverter 66 and over line 192 to the multiplexer 68. When CRS/ is active low, the flip-flop 224 will output a low signal over line 236 to the select input of the multiplexer 68 enabling the multiplexer to output over line 86 the binary data bits appearing on the input line 60 comprising the data message being transmitted over the communication channel 22 of the local area network. The binary data bits appearing on line 86 are clocked into the shift register 90 (FIG. 3B) by the 1.2 MHz clock pulses RXC/ appearing on line 88. At this time the system is looking for the start of a data message from a remote device. The data bits being stored in the shift register unit 90 will be outputted over lines 92 and 94 to the comparators 98 and 102 and also over line 96 to the comparators 100 and 104. When the comparator 98 detects the presence of a D character, a signal will appear on line 103 enabling the comparator 100 to search for the character 5. The comparators 98 and 100 will compare each eight bits of the incoming data message with the data bits on its input lines 194 comprising the character D5. Upon detecting the character D5 in the data message, a signal will appear on the output line 116 of the comparator 100 which is inverted by the inverter 118 and transmitted into the clock input of the flip-flop 120.

The clocking of the flip-flop 120 will output a low signal on its Q/ output line 122 to one input of the NAND gate 124 which receives on its other input line 196 th clock pulses RXC/. The low signal appearing on the input line 122 will gate the clock signals over line 198 as the sync signals SYNC to one input of the NAND gate 200 (FIG. 3B) whose output signals are transmitted through the inverters 202, 204 and 206 which comprises a fast pulse forming circuit for generating high speed clock pulses. The very high speed clock output pulses of the inverter 202 are transmitted over line 208 to the AND gate 210 which outputs the pulses over line 212 to the load and shift input of the shift register 126. In response to receiving these clock pulses over the input line 212, the shift register 126 will write the character D5 over the character preceding the D5 character detected by the comparators 98 and 100. This insertion of the second D5 character in the data message provides a start of message signal to the datascope unit 44 to synchronize the displaying of the data character at this time. The D5 character is wired in the input lines 214 to the shift register 126 unit.

As the shift register 90 (FIG. 3B) outputs the data bits of the incoming message over line 92, the comparators 102 and 104 will compare the first two characters after the character D5 has been detected as indicating the start of a message. As previously described, the first eight bit character will indicate the address of the receiving device while the second eight bit character represents the address of the sending device. In order to display the data messages being outputted by a particular remote device, the manully operated hexadecimal switches 112 and 114 are set to output over lines 216 through the pull-up unit 110, an eight data bit character representing the address of the designated device which data bits are inverted by the inverters 106 and 108 and transmitted over line 217 to the comparators 102 and 104 for use in selecting the data message to be displayed by the datascope unit. Upon finding the address of the designated remote device in the characters of the data message stored in the shift register 90, a high signal will appear on the output line 140 of the comparator 104 which clocks the flip-flop 138 whose output signal over line 218 is gated through the flip-flop 136 and over line 142 to the switch member 146. As previously described, the switch member 146 enables the datascope unit 44 to either screen just the message from the designated remote device or to display all the data messages being transmitted over the communication channel 22 of the local area network.

After the data message of the designated device has been identified, the data message is transmitted through the shift register 168 (FIG. 3B) and through the line driver 172 (FIG. 3C) to the datascope connector 160 from where the data message is transmitted over line 40 to be displayed on the screen of the datascope unit. As each subsequent eight bit character of the data message is transmitted through the shift register units 90, 126, 168, the divide by eight counter 74 (FIG. 3A) will output the signal CHAR indicating the appearance of each subsequent character of the data message. The counter 74 is clocked by the 2 MHz clock pulses appearing on the clock input line 220. These pulses are derived by the counter 72 from the 16 MHz clock pulses appearing on the input line 29 and which were outputted by the clock oscillator 52 (FIG. 2). The counter 72 is enabled by a high signal appearing on input line 222 and transmitted from the flip-flop 224 which in turn is clocked by the low to high transition of the signal CRS/ appearing on the input line 226 and transmitted from the transceiver 20 over line 24 (FIG. 2). The flip-flop 224 also generates a low signal over the input line 236 to the multiplexer 68 switching the multiplexer to output end of message characters in a manner to be described more fully hereinafter.

As each clock pulse is inputted into the multiplexer 68 over input line 70, the counter 74 will count the pulses which, upon reaching the sum of eight, results in the outputting of the character signal CHAR over line 76 indicating the transmission of one eight bit character. The high signal CHAR is inverted by the inverter 78 and inputted over line 79 into the clock input of the shift register 80. The signal CHAR also resets the counter 74 over line 77. As the shift register 80 is clocked, a high signal will sequentially appear on its output lines 81 in a manner that is well known in the art. After six characters have been detected, the high message end signal MSGEND will appear on line 82 which signal clocks the flip-flop 84. The flip-flop 84 outputs over line 228 the message reset signal MSG RST/. This signal is inverted by the inverter 230 and outputted over line 232, resetting the various integrated circuit elements in the bisync control unit 26 in preparation for receiving the next data message.

The data messages transmitted over the communication channel 22 (FIG. 1) do not contain any end of message characters. The only way the end of a message can be detected is by the CRS/ signal going high. End of message processing is required to transmit the remaining two data characters that are held captive in the shift registers 90 and 126 (FIG. 3B). However, this signal is unable to tell the datascope unit to disable synchronization between the interface unit and the datascope unit and to search for the next sync character. In order to tell the datascope unit to disable the synchronization and to start the search, the present invention adds an end of message sequence comprising the data characters FF. When the carrier envelope disappears at the end of a data message, the signal CRS/ going high clocks the flip-flop 224 (FIG. 3A) enabling the Q/ output of the flip-flop to transmit a high signal over line 236 to the select input of the multiplexer 68 which switches the inputs to the multiplexer from the data input line 60 to the input line 238 thereby adding the characters FF to the data message, notifying the datascope unit to disable the synchronization between the units. The captive characters in the shift registers 90 and 126 and the end of message characters are clocked out by a 1.2 MHz clock pulse appearing on input line 70 to the multiplexer 68. The character FF comprises a continuous series of one binary bits which in the present embodiment is +5 volts.

When two or more remote devices are attempting to transmit data messages over the communication channel 22 (FIG. 1) at the same time, a collision occurs. When this happens, the present invention highlights a character in the preamble being displayed on the screen of the datascope unit to indicate such a condition. A collision detect is only valid if it happens before the occurrence of the third character of the data message. If the collision detect occurs after that, it is actually a spurious indication. As previously described, the first character after the occurrence of the start of message characters 184 (FIG. 5) comprises the address of the receiving device while the second character comprises the address of the sending device. A collision is detected when the carrier sense away signal CRSA/ outputted over line 36 from the Manchester decoder unit 30 (FIG. 2) goes high enabling the one shot circuit 164 (FIG. 3C) to output the clear to send signal CTS. This means there has been a loss of the carrier signal at this time. If this occurs before the third character of the message is transmitted to the bisync control unit 26 (FIG. 1), a collision is present and the first or second character of the preamble will be highlighted. If the CRSA/ signal goes high after the third character of the preamble has been received, the clear to send signal CTS is inhibited thereby preventing the highlighting of any of the data characters which normally occurs if a collision is present.

As previously described, the counter 128 (FIG. 3B) will count each binary bit of the data message being stored in the shift register 90 (FIG. 3B). As each eight bits are counted, a low signal will be outputted over line 238 and after being inverted by the inverter 130 will enable the shift register 132 to sequentially output a high signal over its output lines 240. The signal will also reset the counter 128 over line 239. When the second character is clocked into the shift register 132, the high signal appearing on the output line 134 will clock the flip-flop 136 enabling the switch member 146 to transmit a signal over line 242 to the datascope unit 44 (FIG. 1) where the specific data message of the selected device is displayed on the screen of the datascope unit. When the third character is clocked into the shift register 132, a high collision detect inhibit signal COL DET INH appearing on output line 150 and inverted by the inverter 152 is transmitted to one input of the two input NAND gate 154 (FIG. 3C) which inhibits the line driver 156 from outputting the clear to send signal CTS to the datascope connector 160, thereby preventing the highlighting of a character to occur. The clear to send signal is normally outputted by the one-shot circuit 164 for a duration which enables the datascope unit to highlight one of the characters of the data message, thereby visually indicating the presence of a collision as previously described.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the appended claims.

I claim:

1. In a system for transmitting data messages between a plurality of remote processing devices and a datascope for displaying the transmitted data message, in which each data message includes data characters identifying the start of the message and the address of the remote processing device sending the data message;

a communication channel for transmitting data messages outputted by the sending processing device; and an interface unit connected to the communication channel and the datascope for transferring data messages between the communication channel and the datascope which includes:

means for storing the data messages transmitted over said communication channel;

first switch means settable to a position generating data identifying the address of the sending remote processing device;

sensing means coupled to said storing means and said first switch means for generating a first control signal in response to sensing the address characters of the sending remote processing device in the data message stored in said storing means; and means coupled to said sensing means and the datascope for enabling the datascope to display the data message outputted by the sending remote processing device whose address was identified by said sensing means in response to receiving the first control signal.

2. The system of claim 1 in which said interface unit further includes comparator means coupled to said storage means for comparing each character in the data messages stored in said storing means with a predetermined start of message character, said comparator means generating a second control signal in response to sensing the predetermined start of message character in the data message stored in said storing means, said interface unit further including logic means coupled to said comparator means and said storing means for enabling said storing means to insert a second start of message character adjacent the sensed start of message character in the data messages stored in the storing means in response to the generation of said second control signal whereby the datascope will display the data message upon sensing the two start of message characters.

3. The system of claim 1 in which said enabling means includes first logic means coupled to said sensing means for outputting a second control signal in response to receiving said first control signal and second switch means coupled to said first logic means and the datascope and settable to a position for transmitting said second control signal to the datascope enabling the data scope to display the data messages stored in the storing means.

4. The system of claim 3 which further include:

means for outputting a third control control signal to said interface unit indicating the end of the data message transmitted over the communication channel;

said interface unit further including multiplexer means connected to said storing means for transmitting the data message to said storing means;

a source of end of character signals connected to said multiplexer means; and second logic means coupled to said multiplexer means and said outputting means for enabling said multiplexer means to output said end of character signals to said storing means in response to receiving said third control signal whereby the end of character signals are added to the data message stored in said storing means.

5. The system of claim 4 in which said outputting means outputs a fourth control signal to said interface unit indicating the end of the data message transmitted over the communication channel, said interface unit further including third logic circuit means connected to said outputting means and the datascope for outputting a fifth control signal to said data scope thereby enabling the datascope to highlight the data characters of the data message displayed on the datascope in response to the generation of the fifth control signal.

6. The system of claim 5 in which the interface unit further includes counting means for counting the number of data characters being stored in the storing means and register means connected to said counter means and said third logic circuit means for disabling the third logic circuit means from outputting said fifth control signal in response to receiving a predetermined count outputted by said counting means.

7. The system of claim 6 in which said predetermined count is three.

8. In a system for transmitting data messages between a plurality of remote processing devices and a datascope for displaying the transmitted data message, in which each data message includes data characters identifying the start of the data message and the address of the remote processing device sending the data message;

a communication channel for transmitting data messages outputted by the sending processing device; and an interface unit connected to the communication channel and the datascope for transferring data messages between the communication channel and the datascope which interface unit includes:

means for transmitting the data messages from the communications channel to the datascope;

storage means coupled to the transmitting means for storing the data messages transmitted over said communication channel;

a plurality of first switching members each settable to a position to output data identifying the address of one of the sending remote processing devices;

first comparator means coupled to said storage means and said first switching members for generating a first control signal in response to sensing the address of said one of the sending remote processing devices in the data message stored in the storage means; and selecting means including first logic means coupled to said first comparator means and the datascope for enabling the datascope to display the data message outputted by the said one of said sending remote processing devices whose address is identified by said first comparator means in response to receiving the first control signal.

9. The system of claim 8 in which said interface further includes:

a source of start of message characters;

second comparator means connected to said source and said storage means for detecting the start of message character in the data message stored in said storage means, said second comparator means generating a second control signal in response to sensing the start of message character in the data message transmitted over the communication channel; and second logic means coupled to said second comparator means and said storage means for outputting a third control signal to the storage means in response to the generation of said second control signal enabling said storage means to insert a second start of message character in the data message at a position preceding the start of message character detected by the second comparator means whereby the datascope will display the data message upon sensing the two start of message characters.

10. The system of claim 9 in which said first logic means outputs a fourth control signal in response to receiving said first control signal, said selecting means further including second switching means coupled to said first logic circuit means and the datascope which is settable to a position for transmitting said fourth control signal to the datascope enabling the datascope to display the data message stored in the storage means.

11. The system of claim 10 in which said transmitting means outputs a fifth control signal indicating the end of the data message transmitted over the communication channel and through the transmitting means, said interface unit further including:
- a multiplexer circuit connected to said storage means and said transmitting means for transmitting the data message to said storage means;
- a source of end of message characters connected to said multiplexer circuit; and
- third logic circuit means coupled to said multiplexer circuit and said transmitting means for enabling said multiplexer circuit to output said end of message characters to said storage means in response to receiving said fifth control signal whereby the end of message characters are added to the data messag stored in said storage means.

12. The system of claim 11 which further includes decoding means coupled to said transmitting means and said interface unit for outputting a sixth control signal to said interface unit indicating the end of the data message being transmitted over the communication channel, said interface unit further including a one-shot logic circuit means connected to said decoding means and a fourth logic circuit means connected to said one-shot logic circuit means and the datascope, said one-shot circuit means outputting a seventh control signal to said fourth logic circuit enabling the circuit to output said seventh control signal to the datascope whereby the datascope will highlight the data characters of the data messages displayed on the datascope in response to the generation of the seventh control signal.

13. The system of claim 12 in which the interface unit further includes a counter circuit coupled to said second logic circuit means and enabled by said third control signal to count the number of data characters being stored in the storage means and a register circuit connected to said counter circuit and said fourth logic circuit means for disabling the fourth logic circuit means from outputting the seventh control signal in response to reaching a predetermined count outputted by said counter circuit.

14. The system of claim 13 which said predetermined count is three.

* * * * *

UNITED STATES PATENT AND TRADEMARK OFFICE
CERTIFICATE OF CORRECTION

PATENT NO. : 4,775,983

DATED : October 4, 1988

INVENTOR(S) : Fred K. Larimer

It is certified that error appears in the above-identified patent and that said Letters Patent is hereby corrected as shown below:

```
Column 9, line 26, delete "age" and substitute
         --ing--.

Column 12, line 1, delete "messag" and substitute
          --message--.
```

Signed and Sealed this

Seventh Day of March, 1989

Attest:

DONALD J. QUIGG

*Attesting Officer*   *Commissioner of Patents and Trademarks*